(12) United States Patent
Sercinoglu et al.

(10) Patent No.: US 7,877,382 B1
(45) Date of Patent: Jan. 25, 2011

(54) SYSTEM AND METHODS FOR DETECTING IMAGES DISTRACTING TO A USER

(75) Inventors: Olcan Sercinoglu, Mountain View, CA (US); Simon Tong, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 579 days.

(21) Appl. No.: 11/027,020

(22) Filed: Dec. 31, 2004

(51) Int. Cl.
*G06F 7/00* (2006.01)
(52) U.S. Cl. ...................................... 707/723
(58) Field of Classification Search .............. 707/3, 707/5, 723
See application file for complete search history.

(56) References Cited

U.S. PATENT DOCUMENTS

| | | | | |
|---|---|---|---|---|
| 5,615,112 A | * | 3/1997 | Sheng et al. | 707/104.1 |
| 6,065,056 A | * | 5/2000 | Bradshaw et al. | 709/229 |
| 6,185,558 B1 | * | 2/2001 | Bowman et al. | 707/5 |
| 6,240,423 B1 | * | 5/2001 | Hirata | 707/104.1 |
| 6,704,725 B1 | * | 3/2004 | Lee | 707/4 |
| 6,744,935 B2 | * | 6/2004 | Choi et al. | 382/305 |
| 6,795,818 B1 | * | 9/2004 | Lee | 707/3 |
| 6,904,168 B1 | * | 6/2005 | Steinberg et al. | 382/165 |
| 6,999,959 B1 | * | 2/2006 | Lawrence et al. | 707/5 |
| 7,099,860 B1 | * | 8/2006 | Liu et al. | 707/3 |
| 7,158,966 B2 | * | 1/2007 | Brill et al. | 707/3 |
| 2003/0002709 A1 | * | 1/2003 | Wu | 382/100 |
| 2003/0014444 A1 | * | 1/2003 | Wu | 707/515 |
| 2004/0135815 A1 | * | 7/2004 | Browne et al. | 345/810 |
| 2005/0114325 A1 | * | 5/2005 | Liu et al. | 707/3 |
| 2006/0184577 A1 | * | 8/2006 | Kurapati et al. | 707/104.1 |
| 2009/0174551 A1 | * | 7/2009 | Quinn et al. | 340/540 |

\* cited by examiner

*Primary Examiner*—Jean M Corrielus
*Assistant Examiner*—Joshua Bullock
(74) *Attorney, Agent, or Firm*—Blakely Sokoloff Taylor & Zafman LLP

(57) ABSTRACT

Methods and apparatus for detecting distracting search engine results are described. In one embodiment, the method includes monitoring the behavior of a user with respect to a group of images that are related in some manner to a query, and using the monitored behavior to calculate the distractiveness of a particular image. The method also includes adding to a group of images related to a query a set of images that are unrelated to the query and monitoring the behavior of a user with respect to all the images.

22 Claims, 11 Drawing Sheets

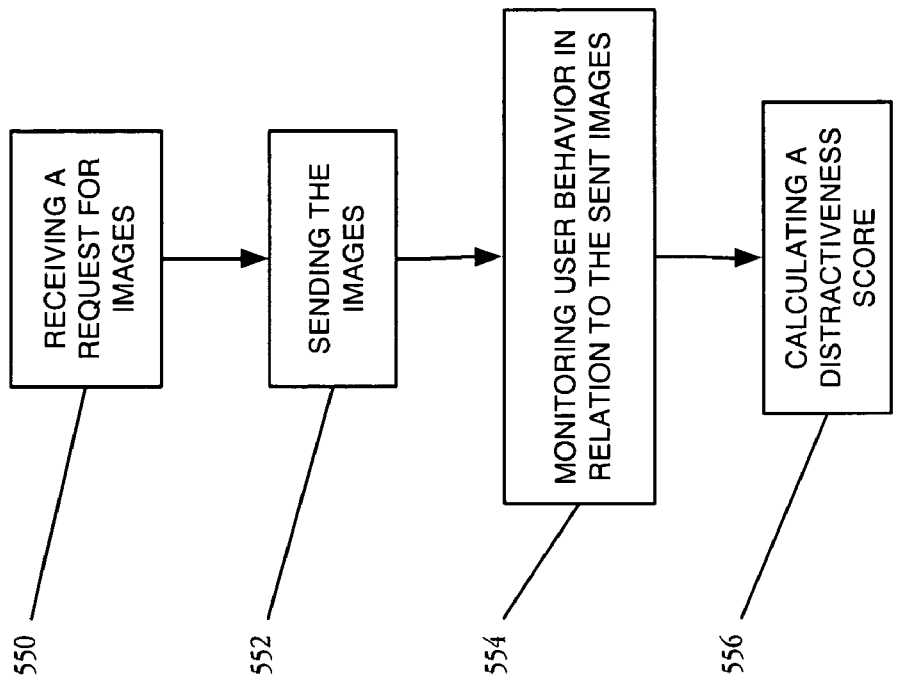

SYSTEM AND METHODS FOR DETECTING IMAGES DISTRACTING TO A USER

TECHNICAL FIELD

The present invention relates generally to image search engines and more particularly to systems and methods for detecting distracting search engine results.

BACKGROUND

The World Wide Web (Web) makes available millions of pictures to the millions of users of the Web. Users can look at pictures of things that interest them that they have never actually seen themselves. This provides users an ability to expand their experiences from the comfort of their home or office.

Currently, image search engines provide a way to find images that the user is presently interested in. Results of a query often include many irrelevant, yet distracting images. One limitation of current search engines is that the user may spend extra time searching through the results. Another limitation of current image search engines is that a user may become distracted by the irrelevant results. Thus, what is desired is a system that helps overcome one or more of the above-described limitations.

SUMMARY

Methods and apparatus for detecting distracting search engine results are described herein.

In one embodiment, the method includes receiving a request for images in the form of a query. The method further includes sending images that are related to the query and monitoring the behavior of a user with respect to the image. Based on the monitored behavior a measure of the distractiveness of the images may be calculated. In other embodiments, the method includes calculating the distractiveness of the images includes not calculating the distractiveness if the original query was pornographic. In further embodiments, the behavior of some subset of all users is monitored.

In one embodiment, the method includes ordering a group of images related to a query based on a retrieved distractiveness score.

In one embodiment, the method includes modifying a group's relationship to a query based on a retrieved distractiveness score. The method further includes further monitoring of the behavior with respect to the images, calculating a present distractiveness score of the images and using the present distractiveness and the retrieved distractiveness score to process a distractiveness score. The processed distractiveness score can then be stored for further operations.

In one embodiment, an apparatus includes a means for receiving requests in the form of queries. The apparatus further includes a means for sending images to the user and monitoring the user's behavior in relation to the sent images. A distractiveness score may be calculated based on the monitored behavior.

In one embodiment, the method includes adding seeded images to a group of images that are related to a request for images. The method includes sending the seeded images along with the related images and monitoring the behavior of a user with respect to all images. The distractiveness score of all images can be calculated based on the monitored behavior.

BRIEF DESCRIPTION OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, various embodiments discussed in the present document.

FIG. 5A is a flow diagram of a method to be carried out on systems depicted in FIG. 2, in accordance with one embodiment of the invention;

DETAILED DESCRIPTION

The following detailed description of embodiments of the present invention refers to the accompanying drawings. The detailed description does not limit the invention. Instead, the scope of the present invention is defined by the appended claims and equivalents.

Overview

Embodiments of the present invention involve methods and systems for detecting images that are irrelevant to a present search query.

Figure 1:
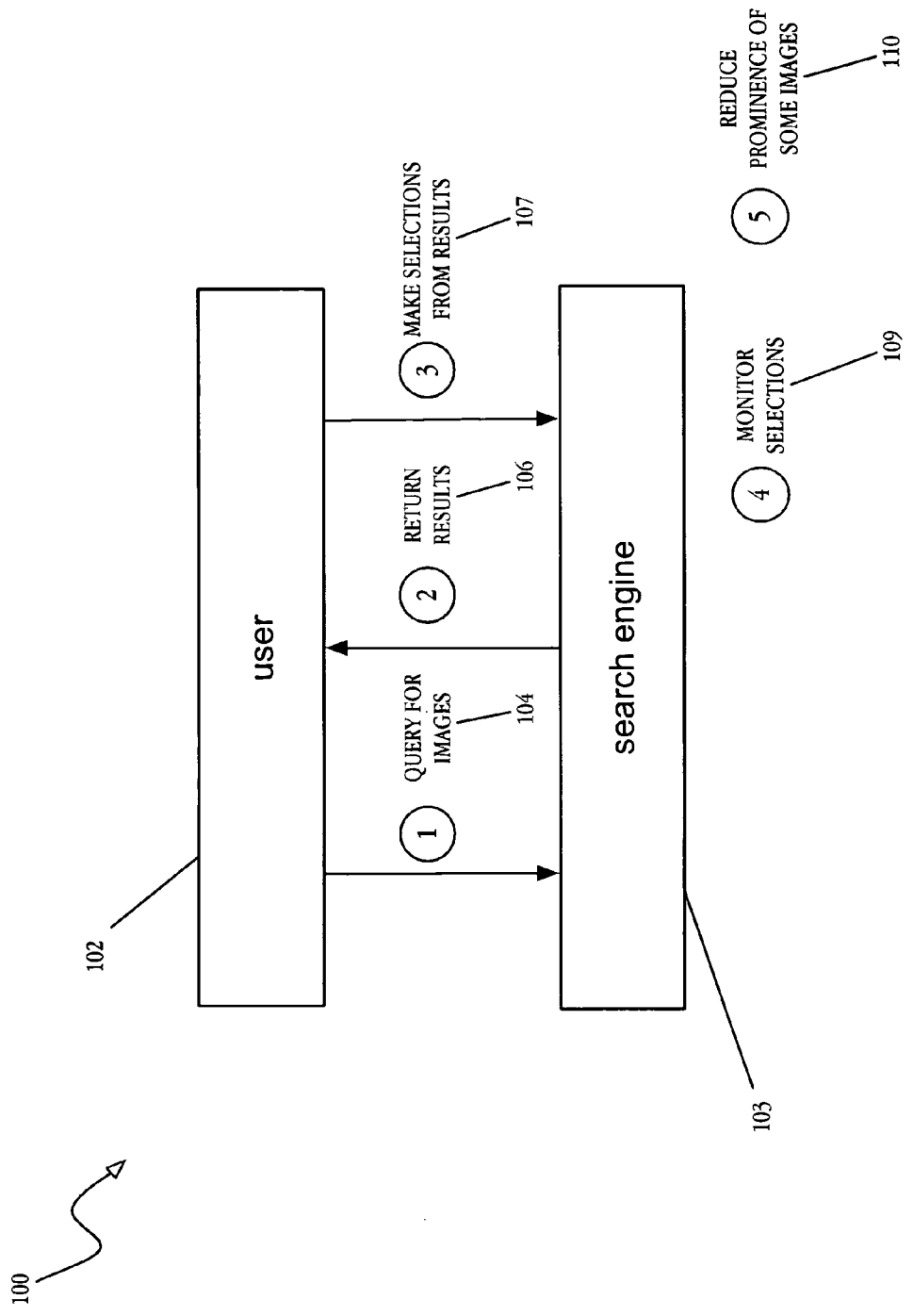
FIG. 1 is a dataflow diagram illustrating dataflow in a system, in accordance with one embodiment of the invention.

FIG. 1 is a dataflow diagram illustrating dataflow in a system, in accordance with one embodiment of the invention. As shown in FIG. 1, the system 100 includes a user 102 and a search engine 103. In an embodiment, the search engine 103 is an image search engine. In phase 1, the search engine 103 receives a query for images. The search engine 103 groups a set of images that are related to the query in some manner, such as relevance, and in phase 2, returns those results to the user 102. In phase 3, the user 102 can make selections from the returned results. In phase 4, the search engine 103 monitors the behavior of the user 102 in relation to the set of images that are returned to the user 102. Within the returned set of images may be images that are selected by the user 102 without regard to the actual query, e.g. distracting images.

"Distracting" is used to denote any group of images that capture the attention or curiosity of the user 102 independent of the initial query. Distracting images may include humorous, offensive, obscene, pornographic or wholly irrelevant images. Without regard to their original query, users 102 tend to select these distracting images for further display. By monitoring these user selections over large numbers of queries, the search engine 103 develops the ability to reduce the prominence of such images in future results or even prevent such images from being displayed at all. Such a system has the advantage of allowing the user 102 to be more productive and efficient in their search.

Those skilled in the art will recognize that many other implementations are possible, consistent with those disclosed here.

Environment and Architecture

Figure 2:
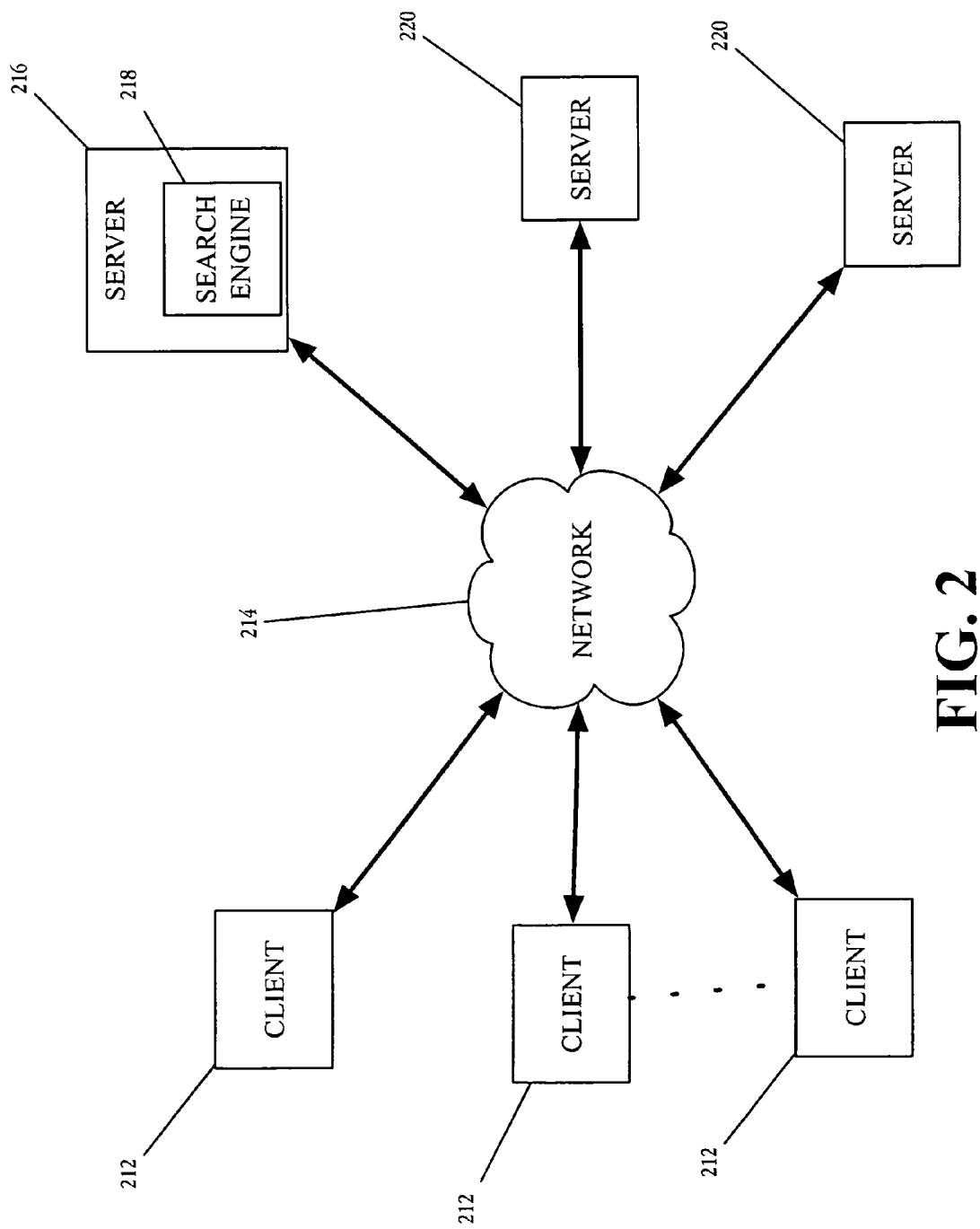
FIG. 2 is a high-level block diagram of a system environment, in accordance with one embodiment of the invention.

FIG. 2 is a high-level block diagram of a system environment, in accordance with one embodiment of the invention. The environment includes a client 212, a network 214, a server 216 including a search engine 218, and other servers 220.

In one embodiment, the client 212 is a computing device, at a user location, from which the user 102 can form and enter requests or queries for images. The client 212 receives responses to the queries for images and displays them to a user 102. The client 212 is configured to allow the user 102 to select images for further display.

The server 216 includes a search engine 218, which performs searches based on the user query. In an embodiment, the search engine 218 maintains a database of link references to images stored on the other servers 220. In another embodiment, the search engine 218 maintains a database of images that are smaller representations of the images stored on the other servers 220. Such smaller representations are commonly called thumbnails. In a further embodiment, the search engine 218 maintains a database of link references to images stored on other servers 220 and, concurrent with the search, will create thumbnails of the images that match, in some manner, the user query.

Figure 3:
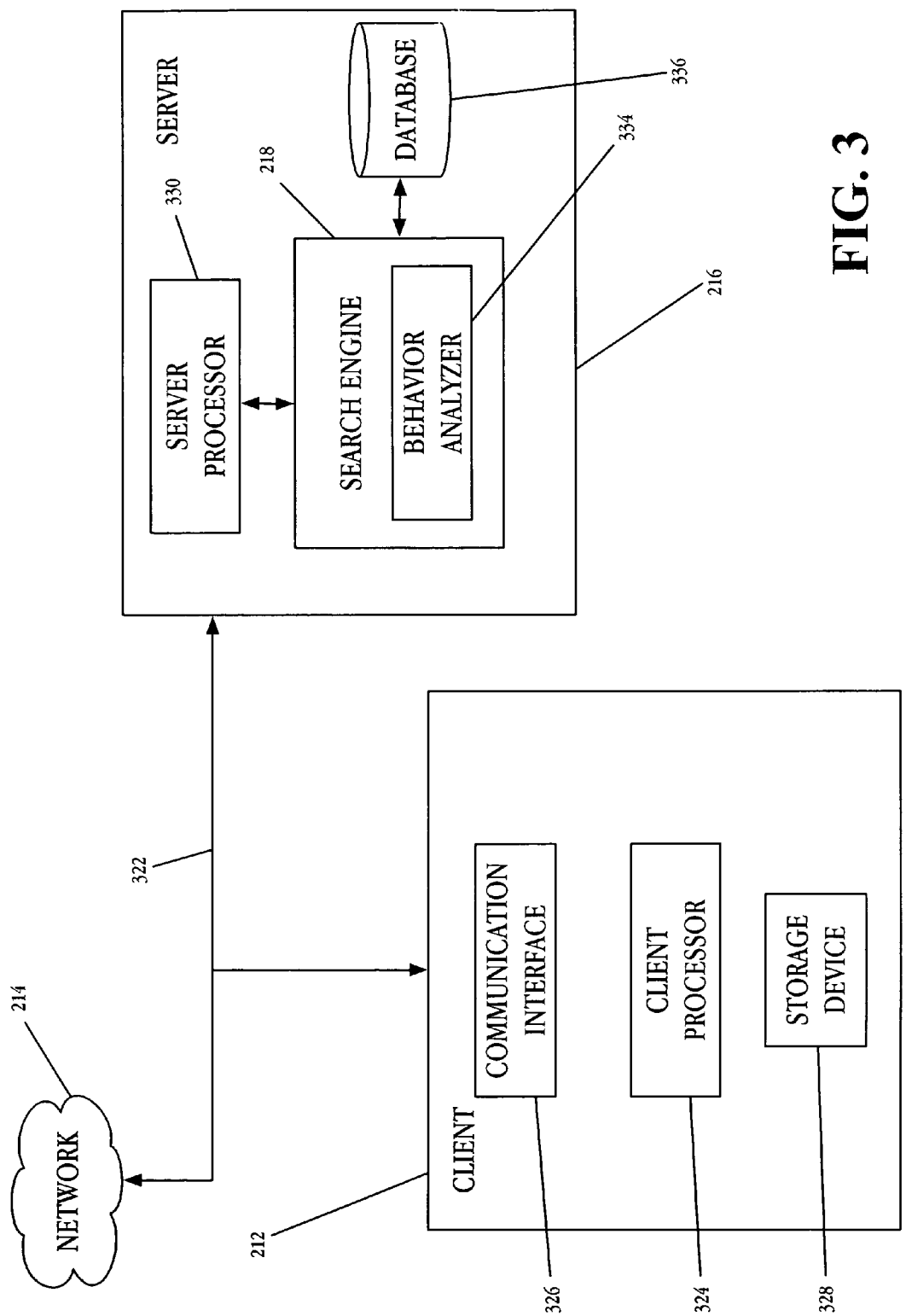
FIG. 3 is a high-level block diagram of systems depicted in FIG. 1, in accordance with one embodiment of the invention.

FIG. 3 is a high-level block diagram of systems depicted in FIG. 1, in accordance with one embodiment of the invention. A client 212 is connected to a server 216 over some communications link, which may include a network 214, such as the Internet.

In one embodiment, the client 212 includes a client processor 324, a communication interface 326, and a storage device 328. Storage device 328 can include any computer readable medium, such as random access memory, hard drive, flash memory, etc. The communications interface 326 is configured as to allow the client 212 to send to and receive from a network 214 requests for data. The client processor 324 is configured to execute instructions contained on the storage device 328 or received from the network 214 by the communications interface 326.

In one embodiment, the server 216 includes a server processor 330, a search engine 218, and a database 336. The search engine 218 further includes a behavior analyzer 334. The database 336 includes image references. In response to a query from a user 102, the search engine 218 searches the database 336 of image references for images that are related to the query. In an embodiment, the database 336 does not maintain any images, but instead maintains references to images that are stored on other servers 220 along with information as to what the image is depicting. In another embodiment, the database 336 maintains thumbnail images as well as references to the actual image and information as to what the image depicts. In a further embodiment, the database 336 maintains the actual images and information as to what the image depicts.

In an embodiment, the behavior analyzer 334 of the search engine 218 monitors the behavior of users in relation to the group of images that are sent to the user in response to a query. The user behavior can include determining which images users select for further viewing, determining how many selections users make for a particular image for a particular query, determining how many different queries a particular image is displayed for, and determining how many selections a particular image receives over a large number of different queries that are unrelated to each other. Queries can be related to other queries based on any number of criteria, such as, common keywords, common subject matter or any suitable commonality. Additionally, information regarding the user behavior with respect to a first image may also be used with respect to a second image that is related to the first image in some manner, including but not limited to image class, i.e. sexually explicit images. Based on these observations, the behavior analyzer 334 performs calculations. In an embodiment, these calculations are directed at modifying future search results. In another embodiment, the calculations are directed towards determining how distracting a particular image is to a user. The behavior analyzer 334 can analyze many different users over time, obtaining statistically significant data as to the distractiveness score of a particular image. Statistical information useful to computing a distractiveness score of a particular image may also, without limitation, include: absolute position of the clicked, or selected image; relative position of the clicked, or selected image; relative clicks or selections, i.e. percentage of total clicks or selections; clicks or selections weighted by position; etc.

In an embodiment, the behavior analyzer 334 is a module that is maintained on the client 212. Configured in such a way, the behavior analyzer 334 can learn over time what images are distracting to an individual user. Though data statistically significant to individual users data may take longer to develop than that for many users, such data is directed to the individual user. In another embodiment, the client 212 has multiple users, such as multiple members of a family. In such an example, the client-side behavior analyzer 334 learns what is distracting for the entire family.

In a further embodiment, the behavior analyzer 334 maintains information as to what is distracting for subsets of the entire grouping of all users on the network. Such subsets could be created demographically, such as all women, or all men. Such an arrangement takes into account that what an average man finds distracting will be different then what an average woman finds distracting. As a large enough sample is obtained over time, groupings such as males aged 30-39 can be used as groupings. In such an arrangement, the behavior analyzer 334 maintains multiple distractiveness scores for each particular image, a distractiveness score for all users, a distractiveness score for all male users, a distractiveness score for all female users, a distractiveness score for all males users between the ages of 30 and 39, etc.

Though depicted as part of the search engine 218, the behavior analyzer 334 may be a separate software module on the server 216. Alternatively, the behavior analyzer 334 may be within another server entirely and communicate its analysis over the network 214 to the server 216 and search engine 218.

It will be appreciated by those skilled in the art that the server 216 may also be configured similarly to the client 212, such that it includes a storage device 328 and a communications interface 326. Further, though the term server is used, it is not meant to denote server device exclusively and is meant to encompass any computing device that receives requests for data and replies to those requests with data. For example, a client device may be a server device to other client devices.

Client processors 324 and server processors 330 can be any number of well known micro-processors, such as processors from Intel Corporation, Motorola, International Business Machines, Advanced Micro Devices, etc. In general, the client device may be any type of computing platform connected to a network that interacts with application programs. Server 216, although depicted as a single computer system, may be implemented as a network of computer processors or server devices.

Figure 4:
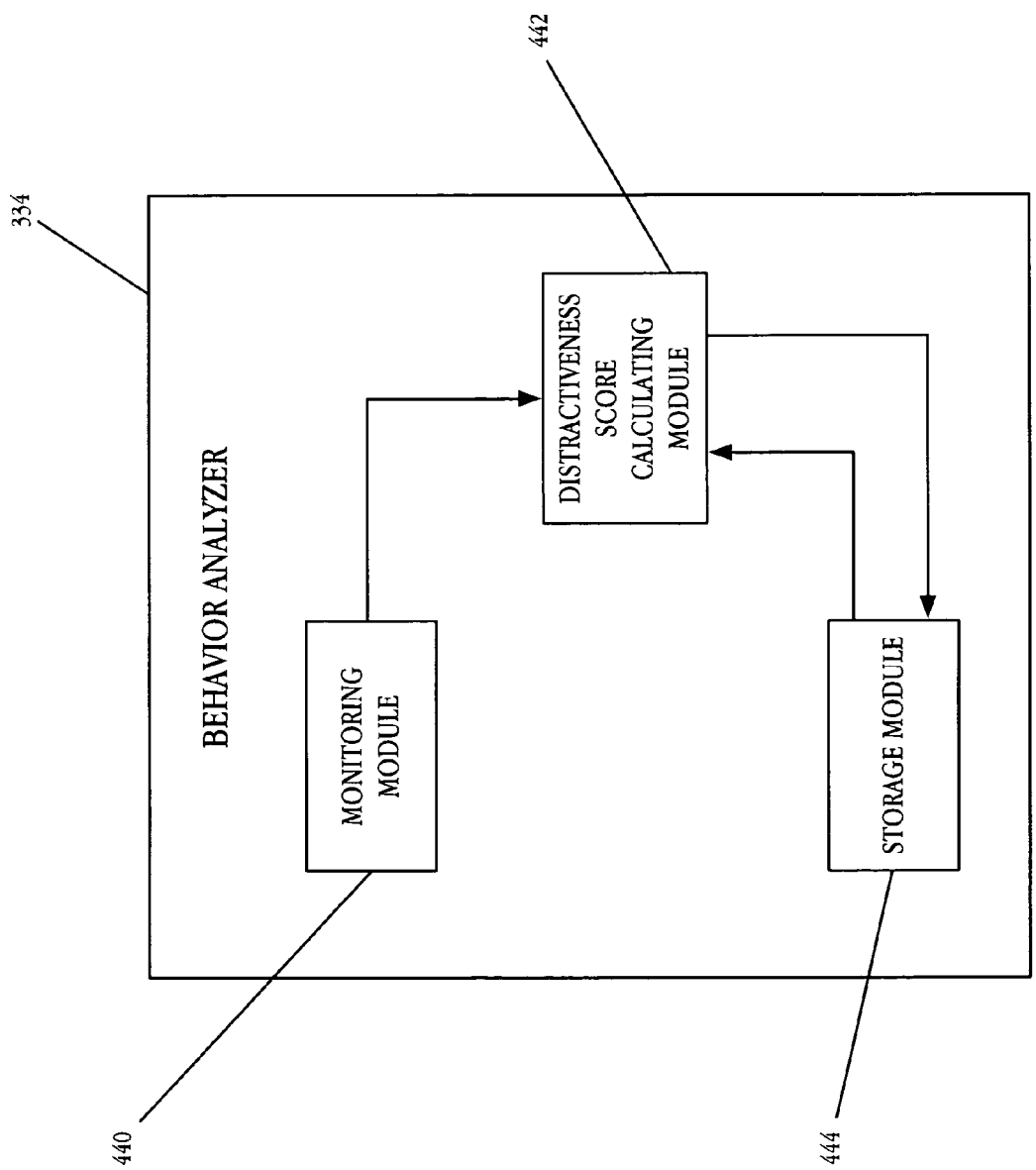
FIG. 4 is a high-level block diagram of a behavior analyzer, such as that depicted in FIG. 3, in accordance with one embodiment of the invention.

FIG. 4 is a high-level block diagram of a behavior analyzer, such as that depicted in FIG. 3, in accordance with one embodiment of the invention. The behavior analyzer 334 includes a monitoring module 440, a distractiveness score calculating module 442 and a storage module 444.

In an embodiment, the monitoring module 440 is configured to perform operations that monitor the behavior of users with relation to a group of images that were sent to them as a result of a search query. Behavior includes the users' selection of particular images.

In an embodiment, the distractiveness score calculating module 442 is configured to receive information from the monitoring module 440 about the monitored behavior of the user in relation to the group of images that were sent to them as a result of a search query. In an embodiment, the group of images sent to the user is a group of images that are determined to be related to the search query. The distractiveness score calculating module 442 analyzes the selection rate of a particular image with relation to a number of queries, including queries that are independent of each other as well as related queries.

In an embodiment, the storage module 444 is configured to receive information from the distractiveness score calculating module 442 about the calculated distractiveness score of a particular image and store that information. In a further embodiment, the storage module 444 is configured to supply information to the distractiveness score calculating module 442 such that the distractiveness score calculating module 442 can calculate the present distractiveness score, combine such score with the stored information and such calculated score can be stored on the storage module 444. In an alternate embodiment, the storage module 444 is a component of the database 336 that is operably coupled to the search engine 218.

Operation

FIG. 5A is a flow diagram of a method to be carried out on systems depicted in FIG. 3, in accordance with one embodiment of the invention. At block 550, a search engine 218 receives a request for images from a client 212. In an embodiment, the request is in the form of a search query, though it is to be appreciated that the request may take other forms, such as a request for all images of a particular file type. The search engine 218 of the server 216 processes the search query by determining a plurality of images contained in a database 336 that are related to the search query. At block 552, the search engine 218 sends to the client 212 the plurality of images. At block 554, the behavior analyzer 334 monitors the behavior of the user to whom the images were sent at block 552. It will be understood that the search engine 218 and the server 216 can receive many other requests concurrently. It will be further understood that monitoring the behavior can be meant to encompass monitoring the behavior of all users in relation to all user requests.

At block 556, the behavior analyzer 334 calculates a distractiveness score for the images sent to the user at block 552. A distractiveness score can be a measure of the irrelevance of a particular data item to the query. For example, a search may be performed for images of Yellowstone National Park. In such an example, humorous cartoon images may be sent to a user. The user tends to click on, or select, these humorous images without regard to the original query. This tendency can be used to measure the distractiveness of a particular image over a number of users. From this measure a distractiveness score can be calculated.

A distractiveness score can be calculated using a measure of the distribution of image requests, or selections, over a large number of unrelated queries or query classes. Additionally, usage of images related to the present images, as well as general image classes, such as sexually explicit images, can also be used to calculate the distractiveness score. Unrelated queries may also be termed independent queries. Independent queries are those queries that have no commonality between their keywords or subject matter, such as queries for naval vessels and queries for animals, which would be independent of each other. Query classes are groups of queries that are related to each other in some fashion, such as by common keywords, subject matter, etc. For example, queries for dog and cats may be in a query class of "pets". The query class of "pets" is unrelated to the query class of "furniture" which includes queries for chairs and tables. Requests for non-distracting images are expected to decrease as the user query tends away from the most relevant query for those images. For example, images of Yellowstone National Park should tend to generate fewer requests as the query departs from "Yellowstone National Park". A user would not expect to see a picture of Old Faithful as a result of a search on dolphins. Distracting images can be displayed for many different unrelated queries. For example, a humorous cartoon animal may be displayed as a result of a query for dolphins or for geysers. As in each of these cases, the user tends to select the humorous image without regard to the original query. The measure of those selections across independent and unrelated queries is a measure of the distractiveness of that particular image. Such a measure can be used to calculate a distractiveness score for that particular image.

Though the term selection is used, it will be appreciated by those skilled in the art that selecting includes clicking. Clicking is a term of art that describes the user's selection of an item by pressing, or clicking, the button on their mouse. Selecting also includes any other method by which a user selection of an item, such as by voice command, depressing the keyboard enter or return key, touching a touch-sensitive display and the like.

It is to be appreciated by those skilled in the art that, with relation to Internet search engines, the most selected links tend to be pornographic in nature. Just as with humorous images, the user tends to select pornographic images out of curiosity. Thus, the most distracting images tend to be pornographic in nature. Instead of measuring the selection rate across all independent queries or query classes, the selection rate across all non-pornographic queries can be used to measure distractiveness score. This takes into account that, when a pornographic query is used, pornographic images are sought. One skilled in the art can, within their own experience, surmise what a pornographic query is and explicit mention of such queries is omitted here. In an embodiment, keywords associated with pornographic queries are maintained.

This may be within the storage module 444 of the behavior analyzer 334 or on a database 336 coupled to the search engine 218. For each query, it can be determined whether the query is pornographic based on a comparison to these maintained keywords. In such a case, a first determination as to the pornographic nature of the query is made and only if the query is non-pornographic will the selection rate across them be measured and used to calculate the distractiveness score.

Another measure used to calculate a distractiveness score is the deviation from a reasonable selection-rate over multiple queries. This reasonable selection-rate may be determined over time by the behavior analyzer 334. Alternatively, a single reasonable selection-rate for all images may be stored in the behavior analyzer 334. A selection-rate of a particular image that exceeds this reasonable rate is indicative of an image that is particularly distracting.

Further, all measures of a distractiveness score can be combined together into an algorithmic function with each measure weighted uniquely, such that:

$$D=f(D_1, D_2, D_3, \ldots)$$

where, D is the overall calculated distractiveness score of a particular image, and $D_n$ is a single calculated measure of distractiveness based on a single criteria, as discussed above, for the particular image. In an embodiment, the function may be a linear combination of all distractiveness measures. In an alternate embodiment, the individual distractiveness scores may be weighted individually. In a further embodiment, the individual distractiveness scores may be dynamically weighted at the time of distractiveness score calculation.

In the above discussion, no distinction is made as to the actual user requesting images through a query. In an embodiment, distinctions can be made as to the actual user requesting images through a query. Subsets of users may also be useful groupings for which to measure distractiveness and calculate a distractiveness score. For example, what women find distracting is different from what men find distracting. Similarly, different age groups can have different behaviors. In an embodiment, a distractiveness score for a subset of users may be calculated with the methods discussed above. In such an example, the behavior of men is monitored separately from that of women. In another embodiment, the selections for a particular user are used for a variety of groups, such that a male, age 30 would have his selections used to calculate a distractiveness score for several groups concurrently, such as all males, males age 25-34, all users age 25-34, etc.

Though mention is made of the server 216 performing these operations, these operations may be performed at the client 212 as well. It will be appreciated that on the server 216 the large number of users querying for images will better support a more accurate measure of a distractiveness score. However, it will also be appreciated that measuring such a distractiveness score at the client 212 would be advantageous in that the distractiveness score will be tailored to that client 212. In an embodiment, the client 212 includes a number of clients, such as lab computers at a high school, such that the aggregate of a distractiveness score of that small number of users can be measured.

Figure 5B:
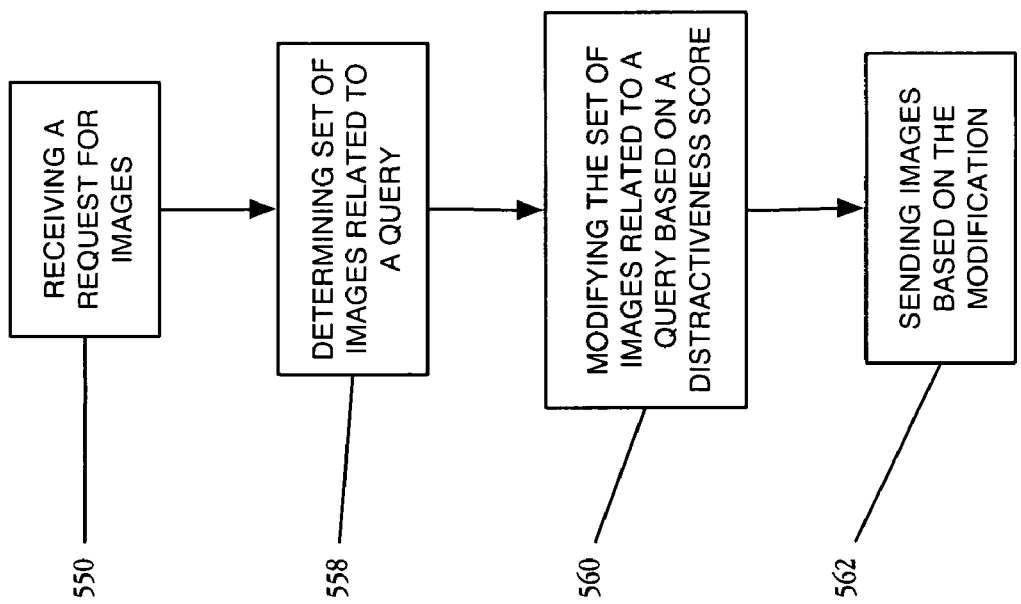
FIG. 5B is a flow diagram of a method to be carried out on systems depicted in FIG. 2, in accordance with one embodiment of the invention.

FIG. 5B is a flow diagram of a method to be carried out on systems depicted in FIG. 2, in accordance with one embodiment of the invention. At block 550, a search engine 218 receives a request for images in the form of a query. At block 558, the search engine 218 determines a set of images stored in the database 336 that are related to the query block 550. The search engine 218 determines which images are related to the query by analyzing the query against information the database 336 maintains. This information may include associated keywords or queries for which the image was determined related to previously. In an embodiment, information about images stored in the database 336 is manually entered into the database. In a further embodiment, information about images stored in the database 336 is created based on contextual information, such as text that is proximate to the display of the image. In a further embodiment, the functions of the database 336 are performed by the storage module 444 of the behavior analyzer 334.

In an embodiment, the behavior analyzer 334 is queried by the search engine 218 for the distractiveness score of each image determined to be related to the query. In another embodiment, the distractiveness score is stored with other information related to the item stored in the database 336. In one embodiment, a single distractiveness score is stored for each image. In an alternate embodiment, a distractiveness score for non-pornographic queries and a distractiveness score for pornographic queries are maintained separately. In a further embodiment, distractiveness scores are maintained for query classes. In yet another embodiment, distractiveness scores are maintained for image classes, such as sexually explicit images. In an embodiment, at block 560, the set of images determined to be related to a query at block 558 is modified based on the distractiveness score of the images. Through the use of such modification at block 562, the items that are distracting can be reduced in prominence to the user. Thus, the truly distracting items, such as humorous cartoon animals, are not displayed concurrently with images directly related to the query. In another embodiment, images related to the query are internal to the database 336 or storage module 444. In such an example, block 560 can be omitted. In this example, at block 562, the display of items block 562 will be altered based on the previously determined distractiveness score of those items.

In an embodiment, the determined set of images related to the query may be left intact in cases where the original query was pornographic in nature. In such a case, it is assumed that the user desires images of this nature and to modify the determined set of images would cause irrelevant images to be displayed in relation to such queries. In an alternate embodiment, modification of the determined set of images, or usage of the distractiveness score, may be used more or less strongly based on the average distractiveness score of all other returned images. For example, pornographic queries will likely have a high average distractiveness score for all the displayed images and the distractiveness score may be used less because of that high average distractiveness score.

Figure 5C:
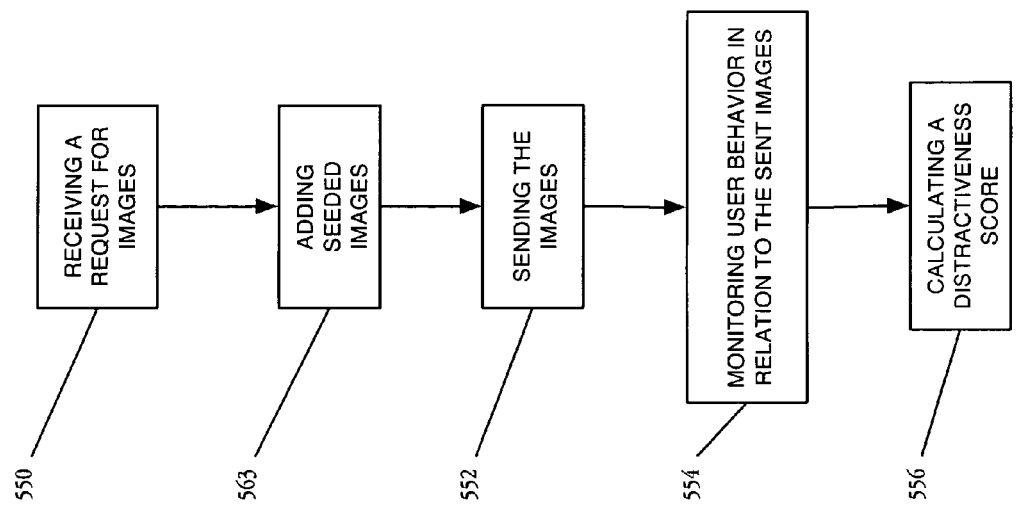
FIG. 5C is a flow diagram of a method to be carried out on systems depicted in FIG. 2, in accordance with one embodiment of the invention.

FIG. 5C is a flow diagram of a method to be carried out on systems depicted in FIG. 2, in accordance with one embodiment of the invention. FIG. 5C is similar to FIG. 5B with the addition of block 563. In one embodiment, at block 563, the search engine 218 adds seeded images to the determined plurality of images contained in the database related to the search query. Seeded images are meant to include, without limitation, any image that is not directly related to the search query, but is added to images related to the search query for the purpose of statistical analysis. Examples of such operations may include user testing to determine the distractiveness score of these seeded images. In another embodiment, the behavior analyzer 334 sends at least one of a plurality of seeding images to the search engine 218 for the purposes of measuring the distractiveness of seeded images. This is known as active analysis, as is known in the art, though is meant to encompass operations where images unrelated to a search query are returned to a user for the purposes of studying the user's behavior with respect to them.

The flow diagrams of FIG. 5A, FIG. 5B and FIG. 5C can be combined to represent a continuous stream of operations for a server 216. In such an example, the server 216 receives requests for images from many clients concurrently. In an embodiment, as discussed above, requests may be in the form of a query. For each of those queries, the search engine 218 determines a set of related images in the database 336. In an embodiment, the search engine 218 adds seeded images to the set of related images. In one embodiment, the search engine 218 also retrieves the distractiveness score of each image and modifies the determined set of images related to the query. In another embodiment, the determined set of images related to all queries has been modified directly in the database 336 such that the search engine 218 does not modify the determined set. The determined set of images is sent to the client 212 according to the modification. The behavior analyzer 334 monitors the behavior of all users with respect to the images sent to them for their individual queries. The behavior analyzer 334 further modifies the stored distractiveness score based on the presently monitored behavior and stores that distractiveness score.

Figure 6A:
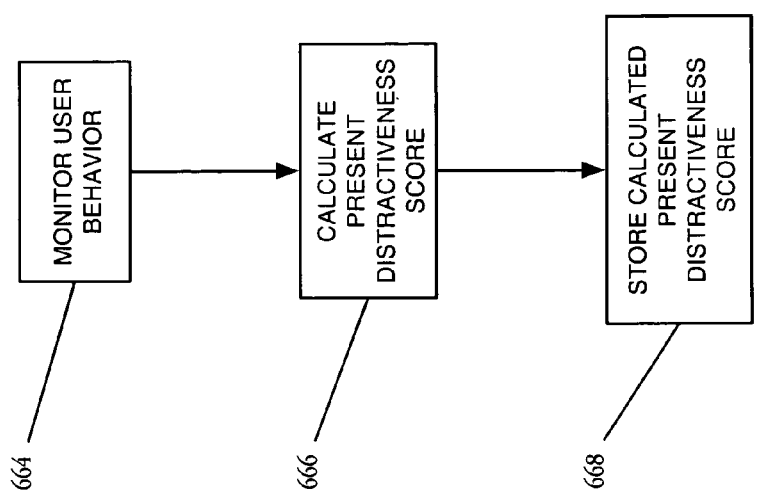
FIG. 6A is a flow diagram of operations carried out by a behavior analyzer, such as that depicted in FIG. 4, in accordance with one embodiment of the invention.

FIG. 6A is a flow diagram of operations carried out by a behavior analyzer, such as that depicted in FIG. 4, in accordance with one embodiment of the invention. At block 664 the behavior analyzer 334 monitors the behavior of users in relation to a set of images. The behavior monitored includes which images the user selects for further viewing. At block 666, the behavior analyzer 334 calculates a distractiveness score based on the monitored behavior. As note above in the discussion of FIG. 5A, images should be selected at a rate that is roughly proportional to their relevance to the query. Images that are selected at a rate that far exceeds this expected rate are probably distracting. Alternatively, a measure of the selection rate over a number of independent queries or query classes can be used to calculate the distractiveness of a particular image. In a further alternate embodiment, a measure of the selection rate over a number of related images or image classes can be at least partially used to calculate the distractiveness of a particular image. At block 668, the behavior analyzer 334 stores information about the distractiveness of a particular image. In an alternate embodiment, at block 668 the behavior analyzer 334 can send information about the distractiveness of a particular image to some storage module not contained within the behavior analyzer 334, such as a database 336 operably coupled to the search engine 218.

Figure 6B:
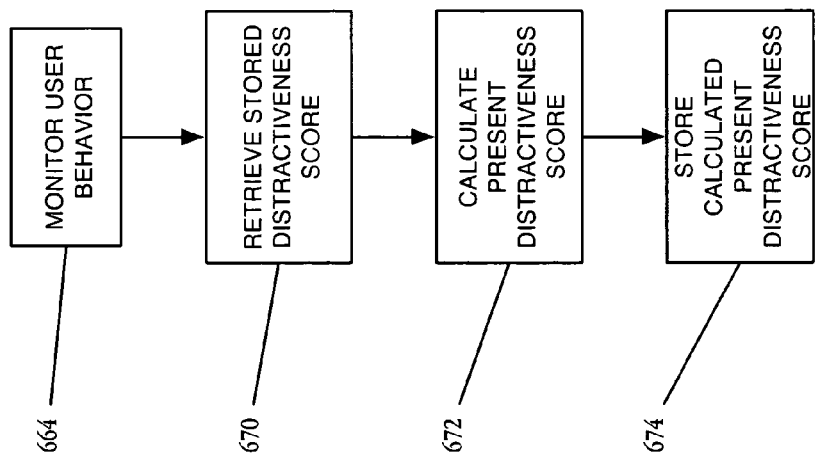
FIG. 6B is a flow diagram of operations carried out by a behavior analyzer, such as that depicted in FIG. 4, in accordance with one embodiment of the invention.

FIG. 6B is a flow diagram of operations carried out by a behavior analyzer, such as that depicted in FIG. 4, in accordance with one embodiment of the invention. At block 664 the behavior analyzer 334 monitors the behavior of users in relation to a set of images. At block 670 the behavior analyzer 334 retrieves a distractiveness score for a particular image. In an embodiment, the behavior analyzer 334 retrieves the distractiveness score from a storage module 444 integral to the behavior analyzer 334. In another embodiment, the behavior analyzer 334 retrieves the distractiveness score from some place other then a storage module 444 that is integral to the behavior analyzer, 334, such as a database 336 operably coupled to the search engine 218. At block 672 the behavior analyzer 334, using the behavior monitored at block 664 and the distractiveness score retrieved at block 670, calculates a present distractiveness score. This has the advantage of allowing for the distractiveness score of a particular image to change over time. At block 674 the behavior analyzer 334 stores the distractiveness score calculated at block 672.

EXAMPLE

Figure 7A:
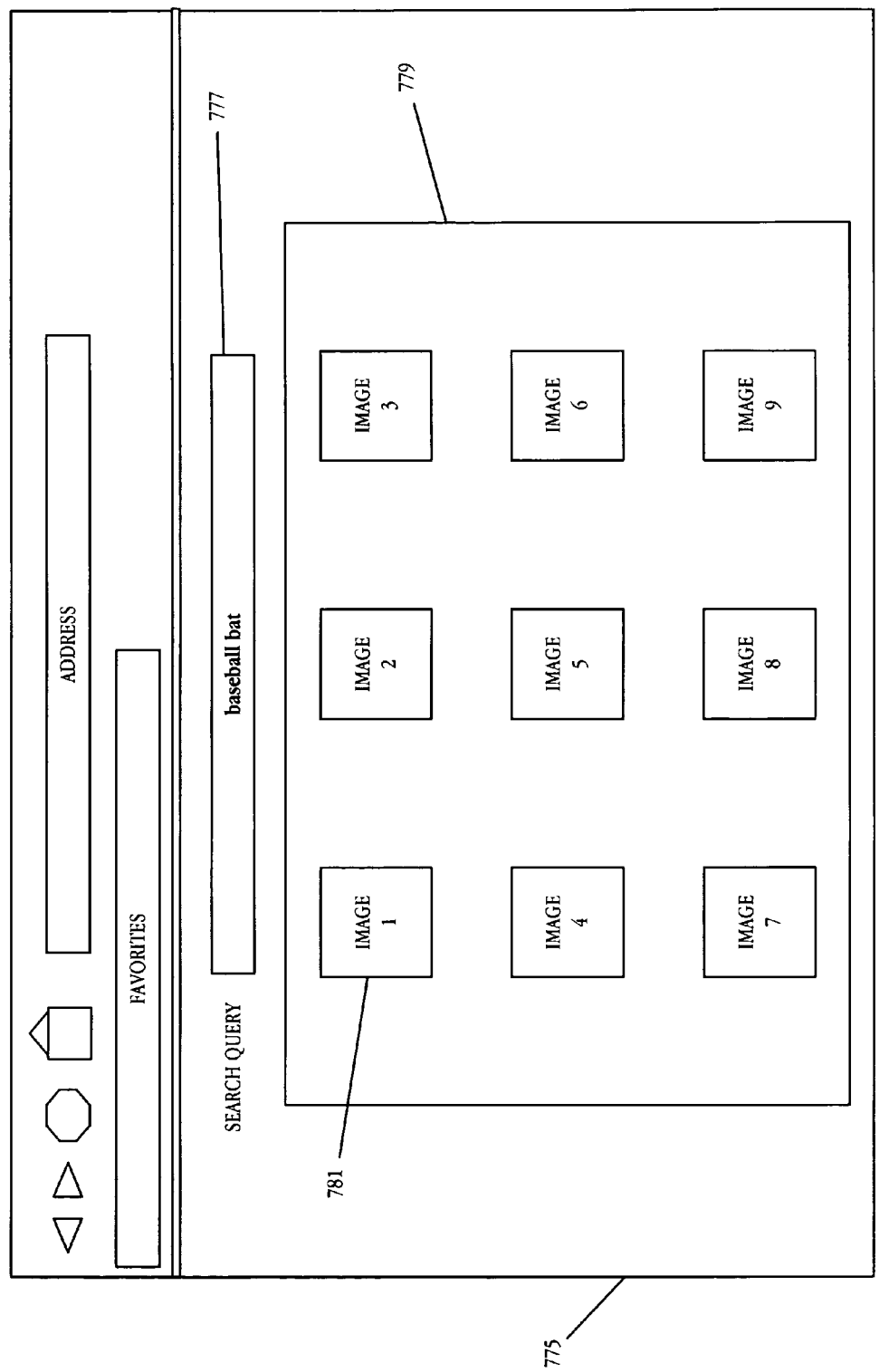
FIG. 7A is an example of a user interface screen, in accordance with one embodiment of the invention.

FIG. 7A is an example of a user interface screen, in accordance with one embodiment of the invention. In FIG. 7A, an example web browser 575 is depicted such as might be used by a user working at their computer. The user supplies a search query 577 for an image search engine using the user query text entry block. The search query supplied in this example is baseball bat. In response to the search query, a set of 9 (nine) images are displayed 579. Say, for example, that Image 1 is a humorous cartoon depiction of one animal striking another with a bat. Though the search was directed at baseball bats, the user was probably expecting pictures of a wooden or aluminum bats. Though one animal is striking another with a bat in Image 1, the search term "baseball bat" is not expected to return such an image. However, as discussed above, the user who entered this may have gotten a quick chuckle from the image and selected it for further viewing. In a typical search engine, this image would now get a positive selection stored with it, such that the next user that searches on "baseball bat" would also get this item displayed first. Without measuring and using the distractiveness score of this image the search engine would continue to display this image more prominently then images of wooden or aluminum bats by themselves.

Figure 7B:
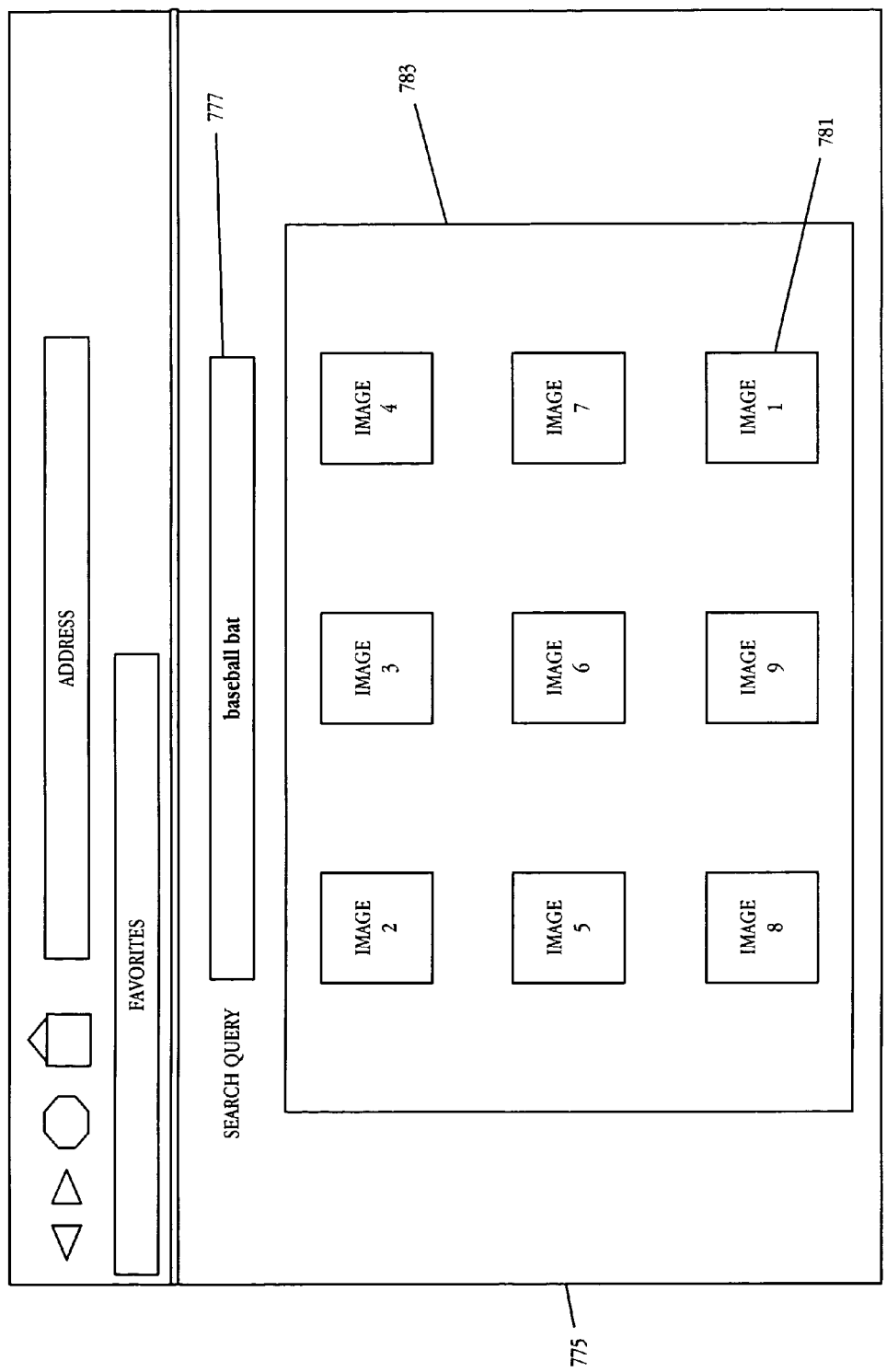
FIG. 7B is an example of a user interface screen, in accordance with one embodiment of the invention.

FIG. 7B is an example of a user interface screen, in accordance with one embodiment of the invention. In this example, the same search query has been supplied, though in this example the server has monitored the previous user's behavior with respect to these images. The server determined that the image was distracting as it had high click rates across a large number of independent and unrelated queries. The search engine demoted Image 1 to the bottom-right position. If future behavior still shows that this image is being selected without regard to the search query, its distractiveness score will go up and will eventually result in the image being removed from all results.

In another embodiment, the systems and methods described above may be used generally with any search engine that retrieves documents. These documents may include, without limitations, images as described above, web pages, etc.

Although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments, and other embodiments not specifically described herein, will be apparent to those of skill in the art upon reviewing the above description.

General

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim.

Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

What is claimed is:

1. A method, comprising:
    receiving at least one request for images based on at least one query;
    sending a plurality of images related to the at least one query;
    monitoring behavior of a user in relation to the plurality of images;
    calculating a distractiveness score of at least one of the plurality of images based on the monitored behavior, the distractiveness score of an image in the plurality of images reduces a prominence of the image in a query result based at least in part on a selection by the user of the image in a first query of the at least one query and the selection by the user of the image in a second query, the first query being unrelated in subject matter to the second query.

2. The method of claim 1, wherein calculating a distractiveness score includes calculating a query-independent selection-rate over the plurality of requests.

3. The method of claim 1, wherein calculating a distractiveness score includes calculating the query-independent selection-rate over a plurality of query classes.

4. The method of claim 1, wherein calculating the distractiveness score further comprises:
    determining if the query is pornographic;
    calculating the selection-rate over the determined non-pornographic queries and not over the determined pornographic queries.

5. The method of claim 1, wherein calculating the distractiveness score includes calculating a number of independent queries for which the one of the plurality of images is included as a result.

6. The method of claim 1, wherein determining the distractiveness score includes calculating a deviation from an expected distribution of selection rates over a plurality of queries for at least one of the plurality of images.

7. The method of claim 1, wherein the user is a subset of all users.

8. The method of claim 7, wherein the subset of all users is based on a demographic grouping.

9. The method of claim 8, wherein the demographic grouping is by sex.

10. The method of claim 8, wherein the demographic grouping is by age.

11. The method of claim 8, wherein the demographic grouping is by geographic area.

12. The method of claim 1, wherein sending a plurality of images includes:
    determining the plurality of images, based on some criteria, wherein the plurality of images are related to the at least one query;
    retrieving at least one stored distractiveness score for at least one of the plurality of images;
    ordering ones of the plurality of images based on the retrieved distractiveness score; and
    sending the plurality of images.

13. The method of claim 12, wherein the retrieved at least one distractiveness score is associated with a demographic group, and wherein the demographic group is associated with the user.

14. The method of claim 12, wherein ordering ones of the plurality of images includes:
    determining a nature of the query;
    if the nature is not pornographic, modifying the plurality of images based on the retrieved at least one distractiveness score by removing at least one image from the plurality of images; and
    ordering the modified plurality of images.

15. The method of claim 12, wherein calculating a distractiveness score includes:
    calculating the distractiveness score based on the monitored behavior and the retrieved at least one distractiveness score for the at least one of the plurality of images; and
    storing the calculated distractiveness score for the at least one of the plurality of images.

16. The method of claim 12, wherein ordering the ones of the plurality of images includes:
    determining if the at least one query is pornographic;
    altering the ones of the plurality of images using the retrieved distractiveness score if the query is non-pornographic and not altering the ones of the plurality of images using the retrieved distractiveness score if the query is pornographic.

17. A system, comprising:
    a processor;
    a communications interface;
    a storage device, wherein the storage device contains machine executable instructions contained therein which when executed cause the processor to perform the following operations,
    receiving at least one request for a set of images based on at least one user query;
    determining the set of images based on some criteria;
    modifying the set based on a stored distractiveness score of at least one of the set of images;
    sending the set of images to a user, wherein the set is arranged using the stored distractiveness score;
    monitoring behavior of the user in relation to at least one of the set of images;
    calculating a distractiveness score based on the monitored behavior and the stored distractiveness score of the at least one of the set of images, the distractiveness score of an image in the set of images reduces a prominence of the image in a query result based at least in part on a selection by the user of the image in a first user query of the at least one user query and the selection by the user of the image in a second user query, the first user query is unrelated in subject matter to the second user query; and
    storing the calculated distractiveness score.

18. A machine readable medium having machine executable instructions contained therein, which when executed perform the following operations:
    receiving at least one request for a set of images based on at least one user query;
    determining the set of images based on some criteria;
    modifying the set based on a stored distractiveness score of at least one of the set of images;
    sending the set of images to a user, wherein the set is arranged using the stored distractiveness score;

monitoring behavior of the user in relation to at least one of the set of images;

calculating a distractiveness score based on the monitored behavior and the stored distractiveness score of the at least one of the set of images, the distractiveness score of an image in the set of images reduces a prominence of the image in a query result based at least in part on a selection by the user of the image in a first user query of the at least one user query and the selection by the user of the image in a second user query, the first user query is unrelated in subject matter to the second user query; and storing the calculated distractiveness score.

19. A method, comprising:

receiving at least one request for images based on at least one query;

determining a plurality of images related to the query to a user;

adding to the determined plurality of images a plurality of seeded images;

sending to the user the determined plurality of images and the added plurality of seeded images;

monitoring behavior of the user in relation to the determined plurality of images and the added plurality of images;

calculating a distractiveness score of at least one of the determined plurality of images or at least one of the added plurality of images based on the monitored behavior, the distractiveness score of an image in the determined plurality of images reduces a prominence of the image in a query result based at least in part on a selection by the user of the image in a first query of the at least one query and the selection by the user of the image in a second query, the first query is unrelated in subject matter to the second query.

20. The method of claim 19, wherein the plurality of seeded images includes images that are unrelated to the at least one query.

21. The method of claim 19, wherein calculating a distractiveness score includes calculating a query-independent selection-rate over the plurality of requests.

22. The method of claim 19, wherein calculating the distractiveness score further comprises:

determining if the query is pornographic;

calculating the selection-rate over the determined non-pornographic queries and not over the determined pornographic queries.

* * * * *